(12) United States Patent
Bockes et al.

(10) Patent No.: US 12,316,734 B2
(45) Date of Patent: May 27, 2025

(54) KEY GENERATION AND PACE PROTOCOL WITH PROTECTION AGAINST SIDE CHANNEL ATTACKS SPYING OUT A NONCE

(71) Applicant: Giesecke+Devrient ePayments GmbH, Munich (DE)

(72) Inventors: Markus Bockes, Munich (DE); Ludger Hemme, Munich (DE); Lars Hoffmann, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 296 days.

(21) Appl. No.: 17/760,016

(22) PCT Filed: Feb. 3, 2021

(86) PCT No.: PCT/EP2021/025040
§ 371 (c)(1),
(2) Date: Aug. 3, 2022

(87) PCT Pub. No.: WO2021/156005
PCT Pub. Date: Aug. 12, 2021

(65) Prior Publication Data
US 2023/0041237 A1 Feb. 9, 2023

(30) Foreign Application Priority Data
Feb. 7, 2020 (DE) .................... 10 2020 000 814.3

(51) Int. Cl.
*H04L 9/00* (2022.01)
*H04L 9/08* (2006.01)
(Continued)

(52) U.S. Cl.
CPC ............ *H04L 9/003* (2013.01); *H04L 9/0825* (2013.01); *H04L 9/0841* (2013.01);
(Continued)

(58) Field of Classification Search
CPC ..... H04L 9/003; H04L 9/0825; H04L 9/0841; H04L 9/0869; H04L 9/3066; H04L 9/3226; H04L 2209/046
(Continued)

(56) References Cited

U.S. PATENT DOCUMENTS 9,584,320 B1   2/2017  Parkinson et al.
9,722,792 B2   8/2017  Morgner
(Continued)

FOREIGN PATENT DOCUMENTS

EP   2639997 A1 *  9/2013  ........... H04L 9/0844
EP   2962439 B1    8/2017

OTHER PUBLICATIONS

Wiesmaier et al., "An Efficient Mobile PACE Implementation," ASIACCS, Mar. 22, 2011, pp. 176-185.
(Continued)

*Primary Examiner* — Bryan F Wright
(74) *Attorney, Agent, or Firm* — Workman Nydegger

(57) ABSTRACT

A method for key generation is arranged in a client processor device, by means of which a second public client key $P_c'$ of the client is generated. The public key $P_c'$ is formed by a calculation, or sequence of calculations, which does not contain any operation whose result depends exclusively on the nonce s and at least one public value, or the public key $P_c'$ being formed by a calculation, or sequence of calculations, where into each operation in which the nonce s enters, at least one non-public value enters the first private client key $k_c$ or the second private client key $k_c'$, for example as a result of the calculation $P_c'=(k_c'\cdot s)\cdot G+(k_c'\cdot k_c)\cdot P_r$.

20 Claims, 2 Drawing Sheets

(51) Int. Cl.
    *H04L 9/30*     (2006.01)
    *H04L 9/32*     (2006.01)
(52) U.S. Cl.
    CPC .......... *H04L 9/0869* (2013.01); *H04L 9/3066* (2013.01); *H04L 9/3226* (2013.01)
(58) Field of Classification Search
    USPC ........................................................ 380/279
    See application file for complete search history.

(56) References Cited

U.S. PATENT DOCUMENTS

| | | | | |
|---|---|---|---|---|
| 10,547,613 | B1* | 1/2020 | Roths | H04L 9/0844 |
| 11,502,816 | B2* | 11/2022 | Alwen | H04L 9/0841 |
| 2016/0006566 | A1 | 1/2016 | Morgner | |
| 2017/0005800 | A9 | 1/2017 | Morgner | |

OTHER PUBLICATIONS

Anonymous, "BSI TR-03110 Advanced Security Mechanisms for Machine Readable Travel Documents," Technical Guidelines, Version 2.10, Mar. 20, 2012, pp. 1-131; Retrieved from the Internet: https://www.bsi.bund.de/EN/Service-Navi/Publications/TechnicalGuidelines/TR03110/BSITR03110.html on Aug. 2, 2022.
BSI, "Technical Guideline TR-03111—Elliptic Curve Cryptography," Version 2.0, Jun. 28, 2012, 44 pages, Retrieved from the Internet: https://www.bsi.bund.de/SharedDocs/Downloads/EN/BSI/Publications/TechGuidelines/TR03111/BSI-TR-03111_pdf.pdf;jsessionid=BEA61004DB0EB5998B41DA8DE81999EA.2_cid360?_blob=publicationFile&v=1 on Apr. 6, 2017.
German Office Action from corresponding German Application No. DE 102020000814.3, Nov. 18, 2020.
International Search Report from corresponding PCT Application No. PCT/EP2021/025040, May 10, 2021.

* cited by examiner

| Step | | Client (chip) | transmit | Server (Terminal) | transmit | User | Comment |
|---|---|---|---|---|---|---|---|
| 1 (generate nonce + transmit) | 1.1 | s = Generate_Nonce()<br>s' = Enc(s; PIN) | | | | | |
| | 1.2 | | s'-> | | | PIN_user = Enter_PIN() | |
| | 1.3 | | | | <- PIN_user | | |
| | 1.4 | | | $s_t$ = Dec(s'; PIN_user) | | | If PIN_user correct (PIN_user == PIN) then $s_t$ = s |
| 2 (generic mapping) | 2.1 | $k_c$ = Generate_secret_key()<br>$P_c$ = Generate_public_key(G; $k_c$) = $k_c$•G | | $k_t$ = Generate_secret_key()<br>$P_t$ = Generate_public_key(G; $k_t$) = $k_t$•G | | | |
| | 2.2 | | $P_c$-><br><-$P_t$ | | | | |
| | 2.3 | $H_c$ = $k_c$•$P_t$ | | $H_t$ = $k_t$•$P_c$ | | | $H_c$ = $H_t$ independent of PIN_user |
| | 2.4 | $G_c'$ = s•G + $H_c$ | | $G_t'$ = $s_t$•G + $H_t$ | | | If $s_t$ == s then $G_c'$ = $G_{t'}$ |
| 3 (ECDH key generation with mapped generator) | 3.1 | $k_c'$ = Generate_secret_key() | | $k_t'$ = Generate_secret_key() | | | |
| | 3.2 | $P_c'$ = Generate_public_key($G_c'$; $k_c'$) = $k_c'$ • $G_c'$ | | $P_t'$ = Generate_public_key($G_t'$; $k_t'$) = $k_t'$ • $G_t'$ | | | |
| | 3.3 | ... | | ... | | | EC-DH, key derivation, authentication (not relevant) |

Fig. 1

| Step | | Client (chip) | transmit | Server (Terminal) | transmit | User | Comment |
|---|---|---|---|---|---|---|---|
| 1 (generate nonce + transmit) | 1.1 | s = Generate_Nonce()<br>s' = Enc(s; PIN) | | | | | |
| | or | | | | | | |
| | E1.1* | m = Generate_Mask()<br>$s_m$ = Generate_masked_Nonce(m)<br>s' = Enc'($s_m$, m; PIN) | | | | | |
| | 1.2 | | s'-> | | | PIN_user = Enter_PIN() | |
| | 1.3 | | | | <- PIN_user | | |
| | 1.4 | | | $s_t$ = Dec(s'; PIN_user) | | | If PIN_user correct (PIN_user == PIN) then $s_t$ = s |
| 2 (generic mapping) | 2.1 | $k_c$ = Generate_secret_key()<br>$P_c$ = Generate_public_key(G; $k_c$) ) = $k_c$•G | | $k_t$ = Generate_secret_key()<br>$P_t$ = Generate_public_key(G; $k_t$) = $k_t$•G | | | |
| | 2.2 | | $P_c$-><br><-$P_t$ | | | | |
| | E2.3* | | | $H_t$ = $k_t$•$P_c$ | | | |
| | E2.4* | | | $G_t'$ = $s_t$•G + $H_t$ | | | |
| 3 (ECDH key generation) | 3.1 | $k_c'$ = Generate_secret_key() | | $k_t'$ = Generate_secret_key() | | | |
| | E3.2* | $P_c'$ = Generate_public_key_with_mapping(G, $P_t$; $s_m$, m, $k_c$, $k_c'$) = ($k_c'$·s)•G + ($k_c'$·$k_c$) •$P_t$ | | $P_t'$ = Generate_public_key($G_t'$;$k_t'$ ) = $k_t'$ • $G_t'$ | | | |
| | 3.3 | | | | | | EC-DH, key derivation, authentication (not relevant) |

Fig. 2

KEY GENERATION AND PACE PROTOCOL WITH PROTECTION AGAINST SIDE CHANNEL ATTACKS SPYING OUT A NONCE

FIELD OF THE INVENTION

The invention relates to a key generation method which is part of an authentication method and key agreement method between a client and a terminal. The authentication method and key agreement method is particularly applicable in the PACE protocol for authenticating and establishing encrypted communication between a machine-readable travel document having a chip and a terminal, with the machine-readable travel document as a client.

PRIOR ART

The PACE protocol BSI TR-03110 (PACE=Password Authenticated Connection Establishment) is a method for authentication and key agreement between the chip of a machine-readable travel document (client) and a terminal which has access to the chip, using a password which is stored in the client in an access-secured manner and which is to be entered at the terminal at the beginning of the PACE protocol.

BSI TR-03111 describes a conversion of the PACE protocol in elliptic curve cryptography. This conversion to elliptic curve cryptography is formed by a sequence of calculation. Each calculation is formed as a combination of one or more operations. As operations, for example, point additions + on an elliptic curve, point multiplications • on the elliptic curve, modular multiplications · modular divisions /, modular additions + or/and modular subtractions − are provided. In the sequence of calculations, each calculation calculates a result. Likewise, each operation within a calculation calculates a result.

The PACE method comprises the following steps, which are illustrated in FIG. 1 using an example of an elliptic-curve-based PACE method. FIG. 1 and FIG. 2 include partly linguistic text, and partly pseudo-program code parts such as "if <condition> then <consequence>" to indicate a corresponding action, e.g. checking that a condition is true and determining or causing a consequence, to a processor device.

1. Generation and transmission of the nonce. Step 1.1: The chip in the client (travel document) generates a random number (nonce) s, which is kept secret, and encrypts it with the password PIN stored internally in the client as the key into an encrypted random number (nonce) s'. Step 1.2: The client sends the encrypted random number s' to the terminal. At the terminal, a user enters the password PIN_user. Step 1.3: The terminal accepts the random number PIN_user entered by the user. Step 1.4: The terminal decrypts the received encrypted random number s' with the password PIN_user entered by the user and receives a number $s_t$ that matches s if the user has entered the correct password (PIN=PIN_user).

2. First ECDH key generation and calculation of a new generator. Step 2.1: The chip and the terminal each generate an asymmetric key pair $[k_c, P_c]$ and $[k_t, P_t]$, respectively, each comprising a private key $k_c$ and $k_t$ and a public key $P_c$ and $P_t$; step 2.2: Client and terminal each send the public key to the other; steps 2.3-2.4: Client and terminal map the random number s or $s_t$ with the help of a mapping function, here generic mapping, to a generator $G_c'$ or $G_t'$ of the mathematical group used, here an elliptic curve. Here, the mapping is substantially a sequence of operations—point multiplications and point additions—on the elliptic curve. If the user has entered the correct password (PIN=PIN_user), $G_c'$ matches $G_t'$.

3. Second ECDH key generation. The chip and the terminal carry out an ECDH—Elliptic Curve Diffie Hellman—key generation. Steps 3.1-3.2: In ECDH key generation the chip and the terminal each generate a second asymmetric key pair $[k_c', P_c']$ and $[k_t', P_t']$, respectively, each comprising a private key $k_c'$ and $k_t'$ and a public key $P_c'$ and $P_t'$ based on the generators $G_c'$ and $G_t'$, respectively, calculated in 2.

In the PACE protocol, the key generation (FIG. 1: 3.2) is followed by key derivation steps and key exchange steps (FIG. 1: 3.3, similar to steps 2.2 and 2.3 of FIG. 1) between client and terminal, until finally the client and the terminal have derived a shared secret that is used for authenticating and encrypting the communication between client and terminal. These further steps following the key generation are not considered further here and can be carried out in connection with the key generation according to the invention as known from the PACE protocol.

More precisely, in step 2.1, a key pair $[k_c, P_c]$ is derived at the client with the following keys. Private key $k_c$ of the client; this is a random number generated by means of a chip-internal function Generate_secret_key( ). Public key $P_c$ of the client; this is derived by means of a chip-internal function Generate_public_key(G; $k_c$) according to $P_c=k_c•G$, by point multiplication • of the client's private key $k_c$ with the generator point G of the elliptic curve. Further, in step 2.1, a key pair $[k_t, P_t]$ is derived at the terminal with the following keys. Private key $k_t$ of the terminal; this is a random number generated by means of a terminal-internal function Generate_secret_key( ). Public key $P_t$ of the terminal; this is derived by means of a terminal-internal function Generate_public_key(G; $k_t$) according to $P_t$=Generate_public_key(G; $k_t$)=$k_t•G$, by point multiplication • of the private terminal key $k_t$ with the generator point G of the elliptic curve.

In the generic mapping represented in steps 2.3-2.4, in step 2.3 in the client an auxiliary point $H_c$ on the elliptic curve is calculated according to $H_c=k_c•P_t$, and in the terminal an auxiliary point $H_t$ on the elliptic curve is calculated according to $H_t=k_t•P_c$. In step 2.4, in the client a mapped generator point $G_c'$ is derived according to $G_c'=s•G+H_c$, and in the terminal a mapped generator point $G_t'$ is derived according to $G_t'=s_t•G+H_t$. If the protocol is executed correctly, $H_t=H_c$ applies regardless of the password PIN_user entered by the user.

In the PACE protocol, so-called public parameters are used. Public parameters are parameters that are known to both the client and the terminal at the beginning of the protocol. Parameters are, for example, curve parameters of the elliptic curve. In the following, we use the term public values to refer to the public parameters as well as all values which the terminal itself can generate or calculate (=form) without the knowledge of the PIN (and therefore of course knows). The public values also include e.g. the auxiliary point $H_t$, as well as the private terminal key $k_t$. In addition, there are non-public values, which are values that are not known to the terminal and which include in particular the first private client key $k_c$, the second private client key $k_c'$.

In side-channel attacks, side-channel information from a processing device executing a calculation is evaluated to find characteristics therein that reflect data used in the calculation. Side-channel information can be, for example, the power consumption of the processor device, or the electromagnetic radiation emitted by it during the execution of the calculation. The calculation can be, for example, a cryptographic calculation. Data can be, for example, input data, secret keys, intermediate values and output data of the calculation.

As can be seen from FIG. 1 of the above representation, in the calculation steps 2.4 and 3.2, respectively one point multiplication on the elliptic curve used is carried out, in which the nonce s or the point $G_c'$ is processed in an unprotected manner. This leads to the fact that side channel information such as power profile or electromagnetic radiation of the processor device in which the calculation takes place can have characteristics that are characteristic for the value of the nonce s or the point $G_c'$.

Through known side-channel attacks such as Simple Power Analysis, SPA, or Differential Power Analysis, DPA, the nonce s could be spied out, but has to remain secret. Results of calculations and results of operations can provide information in side-channel attacks that an attacker can exploit.

SUMMARY OF THE INVENTION

The invention is based on the object of creating a method for key generation that has improved protection against side-channel attacks.

This object is achieved by a method for key generation according to claim 1 or 2. The method for key generation is advantageously applicable in a method for key agreement and authentication. Advantageous configurations of the invention are stated in the dependent claims.

The method for key generation of the invention according to claim 1 and 2 is arranged in a client processor device. The method is arranged to generate a second public client key $P_c'$ of the client.

The method for key generation comprises the steps carried out in the client processor device:

(1.1) generating a nonce s;

(2.1) generating a first asymmetric key pair $[k_c, P_c]$ of the client, comprising a first public client key $P_c$ and a first private client key $k_c$, the first public client key $P_c$ being formed as a result of the point multiplication $P_c = k_c \cdot G$ of the private client key $k_c$ with the generator point G of the elliptic curve;

(2.2) receiving, from a terminal, a first public terminal key $P_t$ which is part of the terminal's first asymmetric key pair comprising the first public terminal key $P_t$ and the first private terminal key $k_t$;

(3.1), (3.2) generating a second asymmetric key pair $[k_c', P_c']$ of the client, comprising the second public client key $P_c'$ and a second private client key $k_c'$;

The method according to a first alternative of the invention is characterized by the public key $P_c'$ being formed by a calculation, or sequence of calculations, which does not contain any operation whose result depends exclusively on the nonce s and at least one public value.

The method according to a second alternative of the invention is characterized by the public key $P_c'$ being formed by a calculation, or sequence of calculations, where into each operation in which the nonce s enters, at least one non-public value enters, in particular the first private client key $k_c$ or the second private client key $k_c'$.

Steps (1.1), (2.1), (2.2) and (3.1) are carried out substantially as in the conventional method for key generation represented in FIG. 1. The conventional steps (2.3), (2.4) are omitted at the client.

In the conventional step (2.4), a point multiplication $s \cdot G$ of the generator point G is carried out with the nonce s present in plain text, so that only two input values generator point G and nonce s enter the calculation.

The generator point G and the public keys, i.e. the first and second public terminal key and the first and second public client key, are public parameters known to an attacker. Therefore, in the operation $s \cdot G$ only nonce s is unknown. Both the operation $s \cdot G$ and the result of the operation $s \cdot G$ can provide an attacker with side-channel information that can make it possible that the secret nonce s can be inferred. Therefore, in particular calculations in which, in addition to a secret value, only public parameters are used are susceptible to side-channel attacks. The point multiplication $s \cdot G$ in the conventional step (2.4) is therefore vulnerable to side-channel attacks.

According to the invention, operations into which only the nonce s and a public value or the nonce s and several public values are entering are avoided. Rather, at least one value enters into each operation, which value is neither the nonce s nor a public value.

This blurs side-channel emissions of the nonce s by the additional side-channel emissions of the value or values that are neither the nonce s nor a public value, making side-channel attacks much more difficult or completely preventing them.

Therefore, according to claim 1, a method for key generation is created which has improved protection against side channel attacks, in particular the attack described above.

For example, in (E3.2\*), the second public client key $P_c'$ can be formed as a result of a calculation in which the generator point G, the nonce s and the second private client key $k_c'$ are processed in a common operation. Then the operation additionally contains the second private client key $k_c'$, so that side channel emissions of the operation are blurred.

Through this, side channel emissions of the nonce s are blurred by the additional side channel emissions of the second private client key $k_c'$, whereby side channel attacks are made much more difficult or are completely prevented.

Another method variant utilizes instead of the nonce a masked nonce and its mask or masks. Masking of the nonce s is not provided for in current methods for key generation, but may be desired in future methods to further increase security against side-channel attacks.

According to an advantageous development, the method for key generation further comprises in step (1.1):

(E1.1\*) generating and making available, or only making available (without internal calculation in the client, i.e., e.g., external calculation and secure transmission into the client), a masked nonce $s_m$ and a masking value m (or several associated masking values) associated with the masked nonce $s_m$.

According to some embodiments, if the masked nonce $s_m$ is e.g. additively masked with $s=(s_m+m) \mod n$ and $m=(\Sigma_{j=1}^{k} m_j) \mod n$ in the case of k masking values, n being the group order of the elliptic curve, in step (E3.2\*) the masked nonce $s_m$ is used together with the mask (masks). The second public client key $P_c'$ is here formed as the result of a combination of operations as stated in the corresponding subclaims.

A method for key agreement and authentication between a client and a terminal, according to the invention, comprises, in addition to the steps of the method for key generation in the client stated above, still further steps in the client, steps of a method for key generation in the terminal, as well as steps in which the terminal sends data to the client or receives data from the client. Here, steps that are effected in or by the client are preceded by a (C), and steps that are effected in or by the terminal are preceded by a (T), subsequent steps that follow after the key generation are preceded by an (AUTH).

In detail, the method for key agreement and authentication comprises the following steps:

(C) (1.1) in the client, encrypting the nonce s (the input to the encryption being, where applicable, the masked nonce and the mask(s)) with a password (PIN) stored in the client, such that an encrypted nonce s'=Enc(s; PIN) (or, where applicable, Enc'($s_m$, m; PIN), where Enc(s; PIN)=Enc'($s_m$, m; PIN) applies, that is, the encryption function Enc' and the mask m are coordinated to each other so that the result s' is generated as without masking) is generated; the password is preferably stored in an access-protected manner so that the client's processor device can call it up and use it in calculations, but that it is not possible to read out the password from the client;

(C) (1.2) transmitting the encrypted nonce s' from the client to the terminal;

(C) in the client, carrying out a method for key generation as described above so that a second public client key $P_c'$ of the client is derived;

(C) (2.2) in the course of the method for key generation in the client, transmitting the first public client key $P_c$ generated here to the terminal;

(T) (1.3) in the terminal, accepting a password PIN_user which has been entered by a user at the terminal;

(T) (1.4) in the terminal, receiving the encrypted nonce s' sent by the client and decrypting the encrypted nonce s' with the password entered by the user, so that a terminal nonce $s_t$=Dec(s,' PIN-user) is derived; Note: if the password PIN_user entered by the user at the terminal was equal to the correct password PIN of the client, then the terminal nonce $s_t$ is also equal to the original nonce s;

(T) in the terminal, carrying out a terminal method for key generation comprising the steps of:

(T) (2.1) in the terminal, generating the first asymmetric key pair [$k_t$, $P_t$] of the terminal, comprising the first public terminal key $P_t$ and a first private terminal key $k_t$, the first public terminal key $P_t$ being formed as a result of the point multiplication $P_t$=$k_t$•G of the first private terminal key $k_t$ with the generator point G of the elliptic curve;

(T) (2.2) in the terminal, receiving, from the client, the first public client key $P_c$;

(T) (3.1), (E3.2\*) in the terminal, generating a second asymmetric key pair [$k_t'$, $P_t'$] of the terminal, comprising a second public terminal key $P_t'$ and a second private terminal key $k_t'$, the second public terminal key $P_t'$ being formed as a result of the point multiplication $P_t'$ =$k_t'$•$G_t'$ of the first private terminal key $k_t'$ with the generator $G_t'$ of the elliptic curve; (AUTH) using the second public client key $P_c'$ and the second public terminal key $P_t'$ in a key agreement and authentication protocol between the client and the terminal, for example in the PACE protocol.

BRIEF DESCRIPTION OF THE DRAWINGS

Hereinafter, the invention will be explained more closely on the basis of embodiment examples and with reference to the drawings, in which are shown:

FIG. 1 Excerpts from an exemplary conventional PACE protocol comprising an elliptic curve Diffie-Hellman method for key generation;

FIG. 2 Excerpts from an exemplary PACE protocol modified according to the invention, comprising a method for key generation, according to one embodiment of the invention which is based on elements of the method in FIG. 1.

DETAILED DESCRIPTION OF EMBODIMENT EXAMPLES

FIG. 1 shows excerpts from an exemplary conventional PACE protocol comprising an elliptic curve Diffie-Hellman method for key generation that has already been described above.

FIG. 2 shows excerpts from an exemplary PACE protocol modified according to the invention, comprising a method for key generation, according to an embodiment of the invention which is based on elements of the method in FIG. 1.

In an already realized, yet unpublished implementation, the PACE protocol was implemented according to the steps described in Table 1 and a multi-add function was provided as described in 2.4. All other required functions correspond to those that are also required for other ECC implementations. The underlying group is an elliptic curve with generator point G having prime number order. In FIGS. 1 and 2, integer variables are denoted with small letters and points on the elliptic curve are denoted with capital letters.

The difference between the method according to the invention in FIG. 2 and the conventional method in FIG. 1 consists substantially in the steps (2.3), (2.4) executed in the client, which are omitted in the method according to the invention, and in the step (E3.2\*) executed in the client, which is modified compared to the conventional method and in which the omitted steps (2.3), (2.4) are taken up.

According to the invention, the second public client key is calculated according to a function $P_c'$=Generate_public_key_with_mapping(G, $P_t$; $s_m$, m, $k_c$, $k_c'$)=($k_c'$·s)•G+($k_c'$·$k_c$)•$P_t$.

According to the embodiment of the invention represented in FIG. 2, the key agreement and authentication method between the client and the terminal is carried out as follows. The order of the steps is effected, insofar as required by the course of the method, in the order stated. If an order is not specified by the method, the order in which the steps are carried out may also differ from the order in which the steps are listed. A masked nonce $s_m$ can be used as a nonce, as shown in FIG. 2 as step E1.1\*. Alternatively, an unmasked nonce s can be used as a nonce, according to step 1.1 of FIG. 1, as indicated in FIG. 2 by the reference to step 1.1 of FIG. 1.

Step 1.1 in the client is effected either without masking the nonce (1.1 as in FIG. 1) or with masking the nonce (E1.1\* as in FIG. 2):

(1.1) without masking the nonce:
(C) (1.1) in the client, generating a nonce s;
(C) (1.1) in the client, encrypting the nonce s, with a password (PIN) stored in the client, so that an encrypted nonce s'=Enc(s; PIN) is generated;
(C) (E1.1\*) with masking the nonce:
(C) (E1.1\*) in the client, generating a mask m by the function m=Generate_mask( );
(C) (E1.1\*) in the client, generating a masked nonce $s_m$ by the function $s_m$=Generate_masked_nonce(m);

(C) (E1.1*) in the client, encrypting the nonce $s_m$ with the mask m and the password PIN stored in the client by the function s'=Enc($s_m$, m; PIN) so that the encrypted nonce s' is generated.

In both cases, non-masked and masked nonce, the method continues as follows:

(C) (1.2) transmitting the encrypted nonce s' from the client to the terminal;

(T) (1.3) in the terminal, accepting a password PIN_user which has been entered by a user at the terminal;

(T) (1.4) in the terminal, receiving the encrypted nonce s' sent by the client and decrypting the encrypted nonce s' with the password entered by the user so that a terminal nonce $s_t$=Dec(s,' PIN-user) is derived;

(C) (2.1) in the client, generating a first asymmetric key pair [$k_c$, $P_c$] of the client, comprising a first public client key $P_c$ and a first private client key $k_c$, the first public client key $P_c$ being formed as a result of the point multiplication $P_c=k_c \cdot G$ of the first private client key $k_c$ with the generator point G of the elliptic curve; the first private client key $k_c$ being a random number which is generated in the client;

(T) (2.1) in the terminal, generating a first asymmetric key pair [$k_t$, $P_t$] of the terminal, comprising a first public terminal key $P_t$ and a first private terminal key $k_t$, the first public terminal key $P_t$ being formed as a result of the point multiplication $P_t=k_t \cdot G$ of the first private terminal key $k_t$ with the generator point G of the elliptic curve; the first private terminal key $k_t$ being preferably a random number which is preferably generated in the terminal;

(C) (2.2) transmitting the first public client key $P_c$ from the client to the terminal;

(T) (2.2) transmitting the first public terminal key $P_t$ from the terminal to the client;

(C) (2.2) in the client, receiving, from the terminal, the first public terminal key $P_t$;

(T) (2.2) in the terminal, receiving, from the client, the first public client key $P_c$;

(T) (E2.3*) in the terminal, generating a derived point $H_t$ on the elliptic curve by point multiplication $H_t=k_t \cdot P_c$ of the first public client key $P_c$ received from the client with the first private terminal key $k_t$;

(T) (E2.4*) in the terminal, deriving a derived generator point $G_t'$ on the elliptic curve by point multiplication of the terminal nonce $s_t$ with the generator point G and point addition of the thereby generated point with the derived point $H_t$, according to $G_t'=s_t \cdot G+H_t$;

(T) (3.1) in the terminal, generating the second private terminal key $k_t'$;

(T) (E3.2*) in the terminal, deriving the second public terminal key $P_t'$ by point multiplication $P_t'=k_t' \cdot G_t'$ of the derived generator point $G_t'$ with the second private terminal key $k_t'$.

(C) (3.1) in the client, generating a second asymmetric key pair [$k_c'$, $P_c'$] of the client, comprising a second public client key $P_c'$ and a second private client key $k_c'$; the second private client key $k_c'$ being a random number which is generated in the client;

(C) (E3.2*) in doing so, the second public client key $P_c'$ is formed as a result of the point operation $P_c'=(k_c' \cdot s) \cdot G+(k_c' \cdot k_c) \cdot P_t$; here, two results of two point multiplications $(k_c' \cdot s) \cdot G$ and $(k_c' \cdot k_c) \cdot P_t$ are generated, once by point multiplication of the product of the second private client key $k_c'$ and the client nonce s (which may optionally be present in masked form) with the generator point G, and once by point multiplication of the product of the second private client key $k_c'$ and the first private client key $k_c$ with the first public terminal key $P_t$; the two results are combined by a point addition so that finally the second public key $P_c'$ of the client is derived;

(AUTH) Use of the second public client key $P_c'$ and the second public terminal key $P_t'$ in an authentication and key agreement protocol between the client and the terminal, for example in the PACE protocol.

The invention claimed is:

1. A method for key generation, arranged in a client processor device, by means of which a second public client key $P_c'$ of the client is derived, wherein the method for key generation comprises the steps carried out in the client processor device:

generating a nonce s;

generating a first asymmetric key pair [$k_c$, $P_c$] of the client, comprising a first public client key $P_c$ and a first private client key $k_c$, the first public client key $P_c$ being formed as a result of a point multiplication $P_c=k_c \cdot G$ of the first private client key $k_c$ with a generator point G of an elliptic curve;

receiving, from a terminal, a first public terminal key $P_t$ which is included in a first asymmetric key pair [$k_t$, $P_t$] of the terminal, which key pair comprises the first public terminal key $P_t$ and a first private terminal key $k_t$;

generating a second asymmetric key pair [$k_c'$, $P_c'$] of the client, comprising a second public client key $P_c'$ and a second private client key $k_c'$;

wherein the second public client key $P_c'$ is formed by a calculation or sequence of calculations using said nonce s, either unmasked or masked, encrypted or unencrypted, wherein the calculation or sequence of calculations does not contain any operation whose result depends exclusively on the nonce s and at least one public value.

2. A method for key generation, arranged in a client processor device, by means of which a second public client key $P_c'$ of the client is derived, wherein the method for key generation comprises the steps carried out in the client processor device:

generating a nonce s;

generating a first asymmetric key pair [$k_c$, $P_c$] of the client, comprising a first public client key $P_c$ and a first private client key $k_c$, the first public client key $P_c$ being formed as a result of the point multiplication $P_c=k_c \cdot G$ of the first private client key $k_c$ with the generator point G of the elliptic curve;

receiving, from a terminal, a first public terminal key $P_t$ which is included in a first asymmetric key pair [$k_t$, $P_t$] of the terminal, which key pair comprises the first public terminal key $P_t$ and a first private terminal key $k_t$;

generating a second asymmetric key pair [$k_c'$, $P_c'$] of the client, comprising a second public client key $P_c'$ and a second private client key $k_c'$;

wherein the second public client key $P_c'$ is formed by a calculation, or sequence of calculations using said nonce s, either unmasked or masked, encrypted or unencrypted, wherein the calculation or sequence of calculations, where into each operation in which the nonce s enters, at least one non-public value enters, in particular the first private client key $k_c$ or the second private client key $k_c'$.

3. The method according to claim 1, wherein:
as a public value or public values, at least one of the following is provided: the generator point G, the first public terminal key $P_t$, the first private terminal key $k_t$, the intermediate value $H_c$ of the PACE protocol.

4. A method for key generation, arranged in a client processor device, by means of which a second public client key $P_c'$ of the client is derived,
wherein the method for key generation comprises the steps carried out in the client processor device:
generating a nonce s;
generating a first asymmetric key pair $[k_c, P_c]$ of the client, comprising a first public client key $P_c$ and a first private client key $k_c$, the first public client key $P_c$ being formed as a result of a point multiplication $P_c = k_c \bullet G$ of the first private client key $k_c$ with a generator point G of an elliptic curve;
receiving, from a terminal, a first public terminal key $P_t$ which is included in a first asymmetric key pair $[k_t, P_t]$ of the terminal, which key pair comprises the first public terminal key $P_t$ and a first private terminal key $k_t$;
generating a second asymmetric key pair $[k_c', P_c']$ of the client, comprising a second public client key $P_c'$ and a second private client key $k_c'$;
wherein the second public client key $P_c'$ is formed by a calculation or sequence of calculations, which does not contain any operation whose result depends exclusively on the nonce s and at least one public value, and
wherein the method further comprises a further step which includes at least one of the following calculations (i), (ii), (iii) or (iv) which comprise therein one or more operations, in particular point additions + or/and point multiplications • or/and modular multiplications · or/and modular divisions /:
(i) $P_c' = P1 + P2$,
with: $P1 = (k_c' \cdot s) \bullet G$ or $P1 = s \bullet (k_c' \bullet G)$, and
with: P2 is equal to the result of an operation or sequence of operations with the second private client key $k_c'$, the first private client key $k_c$ and the first public terminal key $P_t$;
in particular: $P2 = (k_c' \cdot k_c) \bullet P_t$; or $P2 = k_c' \bullet H_c$; or
(ii) $P_c' = (k_c' \cdot s) \bullet (G + (k_c/s) \bullet P_t)$; or
(iii) $P_c' = s \bullet ((k_c' \bullet G) + (k_c'/s) \bullet H_c)$; or
(iv) $P_c' = s \bullet ((k_c' \bullet G) + (k_c' \cdot k_c/s) \bullet P_t)$;
wherein He is equal to the result of the point operation $H_c = k_c \bullet P_t$.

5. The method for key generation according to claim 4, wherein the step of generating a nonce s is carried out as:
generating and making available, or making available, at least one masking value m; generating a masked nonce $s_m$; and
wherein, in the further step, the masked nonce $s_m$ and the masking value m $[s_m, m]$ are used as nonce s.

6. A method for key generation, arranged in a client processor device, by means of which a second public client key $P_c'$ of the client is derived,
wherein the method for key generation comprises the steps carried out in the client processor device:
generating a nonce s;
generating a first asymmetric key pair $[k_c, P_c]$ of the client, comprising a first public client key $P_c$ and a first private client key $k_c$, the first public client key $P_c$ being formed as a result of a point multiplication $P_c = k_c \bullet G$ of the first private client key $k_c$ with a generator point G of an elliptic curve;
receiving, from a terminal, a first public terminal key $P_t$ which is included in a first asymmetric key pair $[k_t, P_t]$ of the terminal, which key pair comprises the first public terminal key $P_t$ and a first private terminal key $k_t$;
generating a second asymmetric key pair $[k_c', P_c']$ of the client, comprising a second public client key $P_c'$ and a second private client key $k_c'$;
wherein the second public client key $P_c'$ is formed by a calculation or sequence of calculations, which does not contain any operation whose result depends exclusively on the nonce s and at least one public value,
wherein the step of generating the nonce s is carried out as:
a step of generating and making available, or making available, at least one masking value m; generating a masked nonce $s_m$; and
wherein the method further comprises step (E3.2*) wherein step (E3.2*) is carried out as one of the following calculations: $P_c' = P1 + P2$,
with: $P1 = (k_c' \cdot s_m + k_c' \cdot (\Sigma_{j=1}^{k} m_j)) \bullet G$ or
$P1 = (k_c' \cdot s_m) \bullet G + \Sigma_{j=1}^{k}((k_c' \cdot m_j) \bullet G)$, and
with: P2 equal to the result of a point operation; or sequence of point operations on the second private client key $k_c'$, the first private client key $k_c$ and the first public terminal key $P_t$.

7. The method according to claim 1, further comprising:
in the client, encrypting the nonce s with a password PIN stored in the client so that an encrypted nonce s'=Enc(s; PIN) is generated, or in the case of a masked nonce $s_m$ (E1.1*) encrypting the masked nonce $s_m$ and the mask m with the password PIN so that an encrypted nonce s'=Enc'($s_m$, m; PIN) is generated;
transmitting the encrypted nonce s' from the client to the terminal.

8. A client processor device arranged to execute a method for key generation according to claim 1.

9. A method for key agreement and authentication between a client and a terminal, comprising the steps of:
in the client, carrying out a method for key generation according to claim 7 so that a second public client key $P_c'$ of the client is derived;
transmitting the first public client key $P_c$ to the terminal;
in the terminal, accepting a password PIN_user which has been entered by a user at the terminal;
in the terminal, receiving the encrypted nonce s' sent by the client and decrypting the encrypted nonce s' with the password PIN_user entered by the user so that a terminal nonce $s_t$=Dec(s,' PIN-user) is derived;
in the terminal, carrying out a terminal method for key generation comprising the steps of:
in the terminal, generating the first asymmetric key pair $[k_t, P_t]$ of the terminal, comprising the first public terminal key $P_t$ and the first private terminal key $k_t$, the first public terminal key $P_t$ being formed as a result of the point multiplication $P_t = k_t \bullet G$ of the first private terminal key $k_t$ with the generator point G on the elliptic curve;
in the terminal, receiving, from the client, the first public client key $P_c$;
in the terminal, generating a second asymmetric key pair $[k_t', P_t']$ of the terminal, comprising a second public terminal key $P_t'$ and a second private terminal key $k_t'$, the second public terminal key $P_t'$ being derived using the first public client key $P_c$ received from the client, the first private terminal key $k_t$, the terminal nonce $s_t'$, the generator point G on the elliptic curve, and the second private terminal key $k_t'$;

using the second public client key $P_c'$ and the second public terminal key $P_t'$ in a key agreement and authentication protocol between the client and the terminal.

10. The method according to claim 9, wherein when generating the second asymmetric key pair $[k_t', P_t']$ of the terminal, the second public terminal key $P_t'$ is derived by the following substeps:

in the terminal, generating a derived point $H_t$ on the elliptic curve by point multiplication $H_t = k_t \cdot P_c$ of the first public client key $P_c$ received from the client with the first private terminal key $k_t$;

in the terminal, deriving a derived generator point $G_t'$ on the elliptic curve by point multiplication of the terminal nonce $s_t$ with the generator point G and point addition of the thereby generated point with the derived point $H_t$, according to $G_t' = s_t \cdot G + H_t$;

in the terminal, generating the second private terminal key $k_t'$;

in the terminal, deriving the second public terminal key $P_t'$ by point multiplication $P_t' = k_t' \cdot G_t'$ of the derived generator point $G_t'$ with the second private terminal key $k_t'$.

11. The method according to claim 9, wherein as a protocol the PACE protocol is used.

12. The method according to claim 1, wherein as the private client key of a respective key pair a random number is provided, which is generated in the client or is generated outside the client and is transmitted securely into the client and is stored there securely—volatile or permanent; or/and wherein as the private terminal key of a respective key pair a random number is provided, which is generated in the terminal or is generated outside the terminal and is stored securely in the terminal.

13. The method according to claim 1, wherein:

as a non-public value, at least one of the following is provided: the first private client key $k_c$, the second private client key $k_c'$.

14. The method according to claim 1, wherein the method further comprises a further step which includes calculation (i) below, which comprises therein one or more operations, in particular point additions + or/and point multiplications • or/and modular multiplications · or/and modular divisions /:

(i) $P_c' = P1 + P2$, with: $P1 = (k_c' \cdot s) \cdot G$ or $P1 = s \cdot (k_c' \cdot G)$, and with: P2 is equal to the result of an operation or sequence of operations with the second private client key $k_c'$, the first private client key $k_c$ and the first public terminal key $P_t$;

in particular: $P2 = (k_c' \cdot k_c) \cdot P_t$; or $P2 = k_c' \cdot H_c$;

wherein $H_c$ is equal to the result of the point operation $H_c = k_c \cdot P_t$.

15. The method according to claim 1, wherein the method further comprises a further step which includes calculation (ii) below, which comprises therein one or more operations, in particular point additions + or/and point multiplications • or/and modular multiplications · or/and modular divisions /:

(ii) $P_c' = (k_c' \cdot s) = (G + (k_c/s) \cdot P_t)$.

16. The method according to claim 1, wherein the method further comprises a further step which includes calculation (iii) below, which comprises therein one or more operations, in particular point additions + or/and point multiplications • or/and modular multiplications · or/and modular divisions /:

(iii) $P_c' = s \cdot ((k_c' \cdot G) + (k_c'/s) \cdot H_c)$; or wherein $H_c$ is equal to the result of the point operation $H_c = k_c \cdot P_t$.

17. The method according to claim 1, wherein the method further comprises a further step which includes calculation (iv) below, which comprises therein one or more operations, in particular point additions + or/and point multiplications • or/and modular multiplications · or/and modular divisions /:

(iv) $P_c' = s \cdot ((k_c' \cdot G) + (k_c' \cdot k_c/s) \cdot P_t)$.

18. The method according to claim 1, further comprising a step which is carried out as a calculation: $P_c' = P1 + P2$, with: $P1 = (k_c' \cdot s_m + k_c' \cdot (\Sigma_{j=1}^{k} m_j)) \cdot G$, and with: P2 equal to the result of a point operation or sequence of point operations on the second private client key $k_c'$, the first private client key $k_c$ and the first public terminal key $P_t$.

19. The method according to claim 1, further comprising a step which is carried out as a calculation: $P_c' = P1 + P2$, with: $P1 = (k_c' \cdot s_m) \cdot G + \Sigma_{j=1}^{k} (k_c' \cdot m_j) \cdot G)$, and with: P2 equal to the result of a point operation or sequence of point operations on the second private client key $k_c'$, the first private client key $k_c$ and the first public terminal key $P_t$.

20. A non-transitory computer-readable medium having instructions stored thereon, which, when executed by a client processor device, cause the client processor device to perform the method according to claim 1.

* * * * *